(12) United States Patent
Mangalam et al.

(10) Patent No.: US 11,878,684 B2
(45) Date of Patent: Jan. 23, 2024

(54) SYSTEM AND METHOD FOR TRAJECTORY PREDICTION USING A PREDICTED ENDPOINT CONDITIONED NETWORK

(71) Applicant: Toyota Research Institute, Inc., Los Altos, CA (US)

(72) Inventors: Karttikeya Mangalam, Berkeley, CA (US); Kuan-Hui Lee, San Jose, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 727 days.

(21) Appl. No.: 17/038,837

(22) Filed: Sep. 30, 2020

(65) Prior Publication Data

US 2021/0295531 A1    Sep. 23, 2021

Related U.S. Application Data

(60) Provisional application No. 62/991,207, filed on Mar. 18, 2020.

(51) Int. Cl.
*B60W 30/095* (2012.01)
*G06T 7/246* (2017.01)
(Continued)

(52) U.S. Cl.
CPC .... *B60W 30/0956* (2013.01); *B60W 50/0097* (2013.01); *G06T 7/246* (2017.01);
(Continued)

(58) Field of Classification Search
CPC ......... B60W 30/0956; B60W 50/0097; B60W 2554/4029; G06T 7/246;
(Continued)

(56) References Cited

U.S. PATENT DOCUMENTS 9,766,626 B1 * 9/2017 Zhu ..................... G01S 13/931
9,805,474 B1 * 10/2017 Whiting .................. G06T 7/20
(Continued)

FOREIGN PATENT DOCUMENTS

CN    115272712 A  * 11/2022    ............. G06V 20/40
CN    115438856 A  * 12/2022    ............. G06Q 10/04
(Continued)

OTHER PUBLICATIONS

Translation of CN-11572712-A, 12 pages, 2022 (Year: 2022).*
(Continued)

*Primary Examiner* — Dale W Hilgendorf
(74) *Attorney, Agent, or Firm* — Christopher G. Darrow; Darrow Mustafa PC

(57) ABSTRACT

A system for trajectory prediction using a predicted endpoint conditioned network includes one or more processors and a memory that includes a sensor input module, an endpoint distribution module, and a future trajectory module. The modules cause the one or more processors to the one or more processors to obtain sensor data of a scene having a plurality of pedestrians, determine endpoint distributions of the plurality of pedestrians within the scene, the endpoint distributions representing desired end destinations of the plurality of pedestrians from the scene, and determine future trajectory points for at least one of the plurality of pedestrians based on prior trajectory points of the plurality of pedestrians and the endpoint distributions of the plurality of pedestrians. The future trajectory points may be conditioned not only on the pedestrian and their immediate neighbors' histories (observed trajectories) but also on all the other pedestrian's estimated endpoints.

17 Claims, 6 Drawing Sheets

(51) Int. Cl.
*G08G 1/005* (2006.01)
*B60W 50/00* (2006.01)

(52) U.S. Cl.
CPC ..... *G08G 1/005* (2013.01); *B60W 2554/4029* (2020.02); *G06T 2207/20084* (2013.01); *G06T 2207/30196* (2013.01); *G06T 2207/30241* (2013.01); *G06T 2207/30252* (2013.01)

(58) Field of Classification Search
CPC . G06T 2207/20084; G06T 2207/30196; G06T 2207/30241; G06T 2207/30252; G08G 1/005
See application file for complete search history.

(56) References Cited

U.S. PATENT DOCUMENTS

| | | | | |
|---|---|---|---|---|
| 2016/0300485 | A1* | 10/2016 | Ayvaci | G06V 20/58 |
| 2019/0073524 | A1* | 3/2019 | Yi | G06V 10/454 |
| 2021/0245744 | A1* | 8/2021 | Mangalam | B60W 30/0956 |
| 2021/0339767 | A1* | 11/2021 | Karaman | G05D 1/0214 |
| 2022/0198254 | A1* | 6/2022 | Dalli | G06N 3/042 |
| 2022/0242453 | A1* | 8/2022 | Hahn | G06V 20/58 |
| 2022/0292867 | A1* | 9/2022 | Zhang | G06T 7/73 |
| 2023/0001953 | A1* | 1/2023 | McAllister | B60W 60/0027 |
| 2023/0038673 | A1* | 2/2023 | Masoud | B60W 30/095 |
| 2023/0257003 | A1* | 8/2023 | Malekmohammadi | G06V 10/762 382/104 |

FOREIGN PATENT DOCUMENTS

| | | |
|---|---|---|
| GB | 2562049 A | 11/2018 |
| JP | 2011070384 A | 4/2011 |

OTHER PUBLICATIONS

Translation of CN-11548856-A, 7 pages, 2022 (Year: 2022).*
Rehder et al., "Pedestrian Prediction by Planning using Deep Neural Networks," pp. 1-9, arXiv:1706.05904v2 [cs.CV] Jun. 20, 2017.
Kerfs, "Models for Pedestrian Trajectory Prediction and Navigation in Dynamic Environments," California Polytechnic State University, Thesis by Jeremy Kerfs (2017).
Asahara et al., "Pedestrian-movement prediction based on mixed Markov-chain model," Proceedings of the 19th ACM SIGSPATIAL International Conference on Advances in Geographic Information Systems, 19 pages (2011).
Katyal et al., "Intent-Aware Pedestrian Prediction for Adaptive Crowd Navigation," 2020 IEEE International Conference on Robotics and Automation (ICRA), 7 pages (2020).

* cited by examiner

SYSTEM AND METHOD FOR TRAJECTORY PREDICTION USING A PREDICTED ENDPOINT CONDITIONED NETWORK

CROSS-REFERENCE TO RELATED APPLICATION

This application claims the benefit of U.S. Provisional Patent Application No. 62/991,207, "System and Method for Endpoint Conditioned Trajectory Prediction," filed Mar. 18, 2020, which is incorporated by reference herein in its entirety.

TECHNICAL FIELD

The subject matter described herein relates, in general, to systems and methods for predicting the movement of pedestrians.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have sensors that can detect objects found in the environment that the vehicle is operating within. Some of these detected objects include moving objects, such as other vehicles and pedestrians. Regarding pedestrians, the predicted movement of a pedestrian may be utilized by several downstream components of an autonomous vehicle system, such as path planning and decision-making.

Some current methodologies model the dynamics of pedestrian movement by directly relying on social, scene, and/or other cues. For example, some current methodologies use a "social forces" model that generates energy terms to avoid collisions with scene elements, other pedestrians in the scene, etc. Some other methodologies utilize a more data-driven approach to dynamic modeling by relying on deep models for learning underlying mechanics without explicit modeling.

SUMMARY

This section generally summarizes the disclosure and is not a comprehensive explanation of its full scope or all its features.

In one embodiment, a system for trajectory prediction using a predicted endpoint conditioned network includes one or more processors and a memory in communication with the one or more processors. The memory includes a sensor input module, an endpoint distribution module, and a future trajectory module.

The sensor input module includes instructions that, when executed by the one or more processors, causes the one or more processors to receive sensor data of a scene having a plurality of pedestrians. The scene may be a static scene or may move with the movement of an ego vehicle.

The endpoint distribution module includes instructions that, when executed by the one or more processors, causes the one or more processors to determine endpoint distributions of the plurality of pedestrians within a scene based on the sensor data using a convolutional variational autoencoder. The endpoint distributions represent the desired end destinations of the plurality of pedestrians from the scene.

The future trajectory module includes instructions that, when executed by the one or more processors, causes the one or more processors to determine future trajectory points for at least one of the plurality of pedestrians based on prior trajectory points and the endpoint distributions of the plurality of pedestrians. The future trajectory points may be conditioned not only on the pedestrian and their immediate neighbors' histories (observed trajectories) but also on all the other pedestrian's estimated endpoints.

In another embodiment, a method for trajectory prediction includes the steps of determining endpoint distributions of a plurality of pedestrians within a scene and determining future trajectory points for at least one of the plurality of pedestrians based on prior trajectory points of the plurality of pedestrians and the endpoint distributions of the plurality of pedestrians. Like before, the endpoint distributions represent the desired end destinations of the plurality of pedestrians from the scene.

In yet another embodiment, a non-transitory computer-readable medium has instructions that, when executed by one or more processors, cause the one or more processors to obtain sensor data of a scene having a plurality of pedestrians, determine endpoint distributions of the plurality of pedestrians within the scene, and determine future trajectory points for at least one of the plurality of pedestrians based on prior trajectory points of the plurality of pedestrians and the endpoint distributions of the plurality of pedestrians.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for performing trajectory prediction of one or more pedestrians that utilizes a predicted endpoint conditioned network (PECNet). PECNet infers distant trajectory endpoints to assist in long-range multi-modal trajectory prediction. PECNet predicts the movement of one or more pedestrians by utilizing two daisy-chained steps. In the first step, endpoint distributions of a plurality of pedestrians within a scene are determined. The endpoint distributions generally represent the desired endpoint destinations of the plurality of pedestrians from the scene. This may be modeled by generating a motion history for the plurality of pedestrians by encoding prior trajectory points of the plurality of pedestrians.

In the second step, future trajectory points for at least one of the plurality of pedestrians are determined based on both the prior trajectory points of the plurality of pedestrians and the endpoint distributions of the plurality of pedestrians in order to predict socially compliant future trajectory points.

Figure 1A:
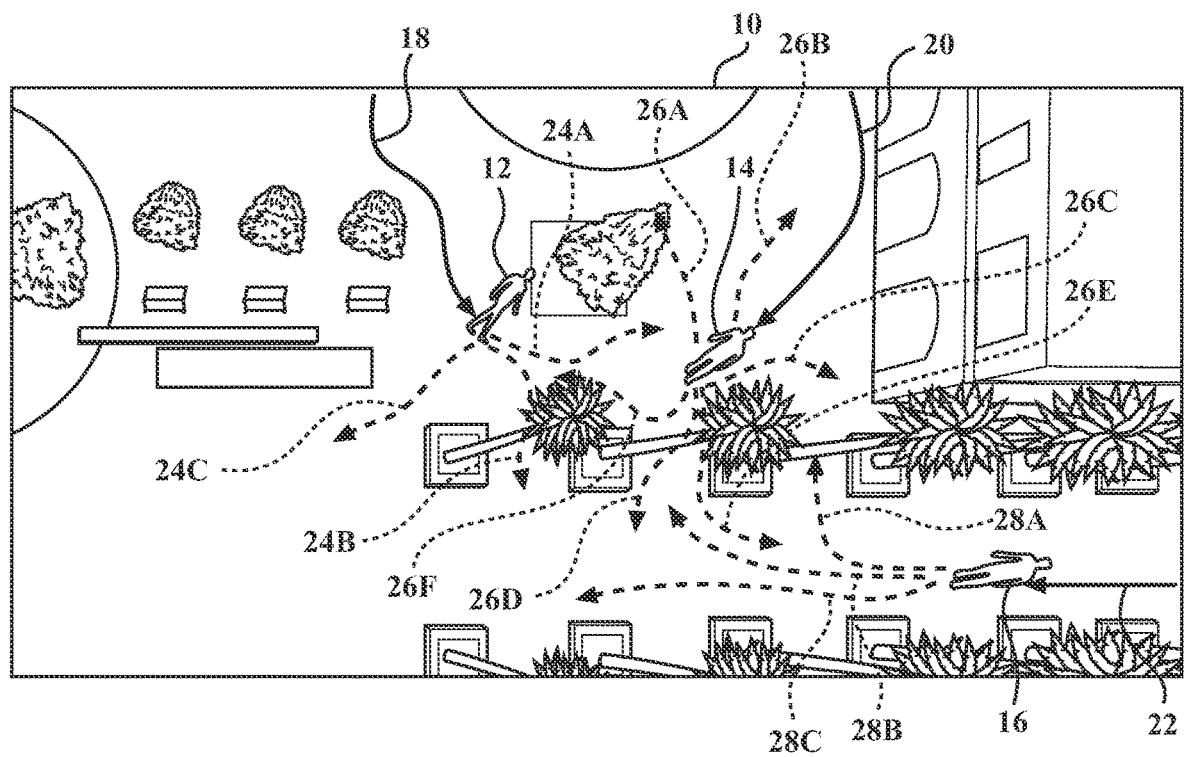
FIGS. 1A-1D illustrate, at a scene level, the path planning process performed by a predicted endpoint conditioned network.

In an effort to better describe how PECNet is able to predict the movement of pedestrians more accurately within a scene, reference is made to FIGS. 1A-1D that provide a visual representation of the overall problem and how PECNet solves the problem of accurately predicting the movement of pedestrians. More specifically, FIG. 1A illustrates a scene 10 that includes pedestrians 12, 14, and 16. The scene 10 may be a fixed scene or may be a moving scene based on the movement of a vehicle that includes sensors for detecting the pedestrians 12, 14, and/or 16 and other aspects of the scene 10.

Here, the pedestrians 12, 14, and 16 have been observed to have motion histories 18, 20, and 22, respectively. The motion histories 18, 20, and 22 may be a collection of trajectories indicating the position and the trajectory of the pedestrians 12, 14, and/or 16 over a previous time. However, while simple observation can determine the motion histories 18, 20, and 22 of the pedestrians 12, 14, and 16, respectively, determining the future trajectory points of the pedestrians 12, 14, and 16 is much more difficult. For example, the pedestrian 12 may move in any one of a number of different directions, such as illustrated by the arrows 24A-24C. The same is true for the other pedestrians 14 and 16. The pedestrian 14 may move in any one of a number of different directions, as illustrated by the arrows 26A-26F, while the pedestrian 16 may move in a number of different directions, as illustrated by the arrows 28A-28C.

Additionally, it should be understood that the arrows 24A-24C, 26A-26F, and 28A-28C are merely examples of the possible future movements of the pedestrians 12, 14, and 16, respectively. As such, the direction of the movement of the pedestrians 12, 14, and 16 are far more numerous than indicated by the arrows 24A-24C, 26A-26F, and 28A-28C, compounding the difficulty in accurately predicting the movement of the pedestrians 12, 14, and 16.

Figure 1B:
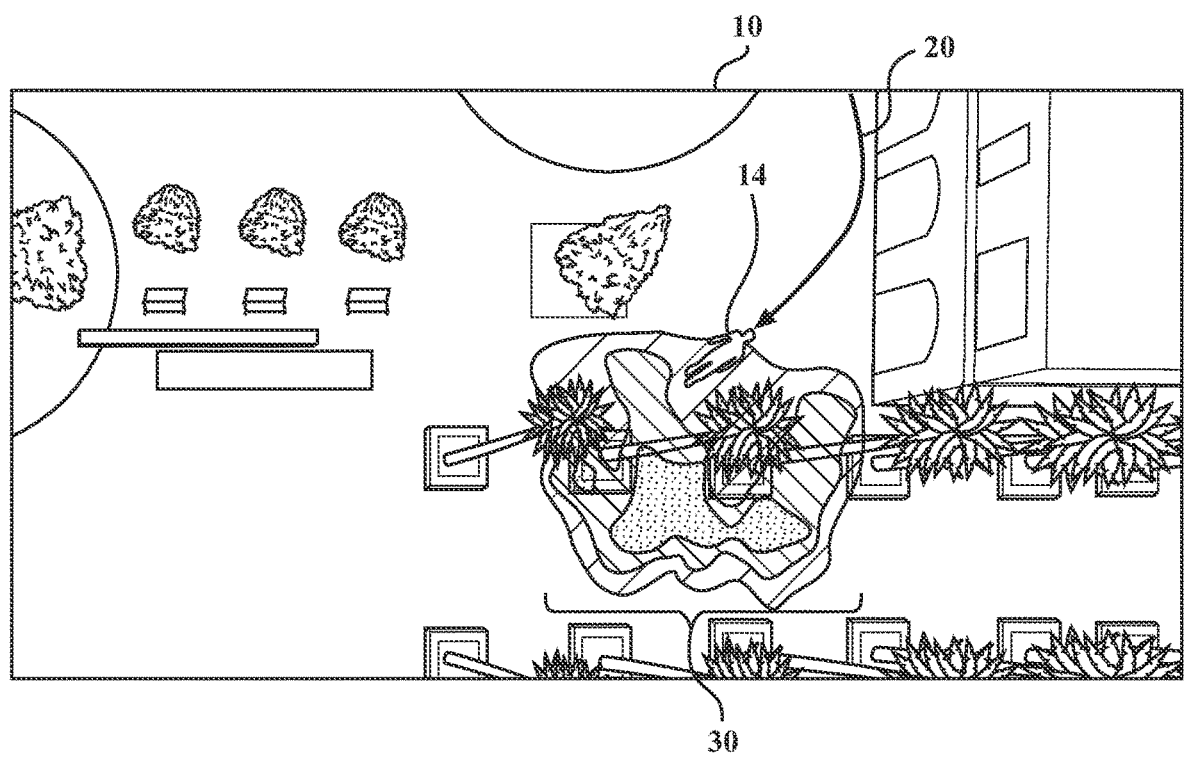

As stated before, PECNet is able to accurately predict the movement of pedestrians, such as the pedestrians 12, 14, and 16 within the scene 10 by breaking down the problem of prediction into two daisy-chained steps. The first step involves inferring a local endpoint distribution for each of the pedestrians 12, 14, and 16. As best shown in FIG. 1B, an endpoint distribution 30 for the pedestrian 14 is shown. The endpoint distribution 30 may represent one or more endpoints that represent the desired destination for the pedestrian 14 within or from the scene 10.

Figure 1C:
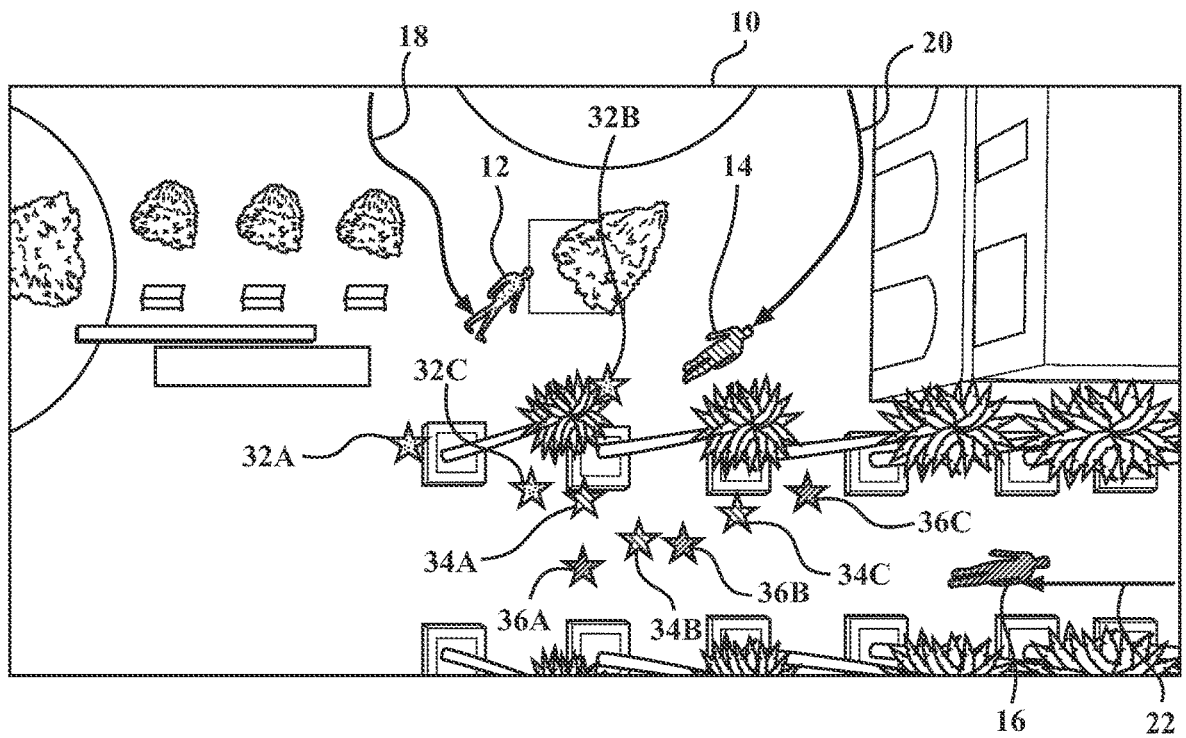
Figure 1D:
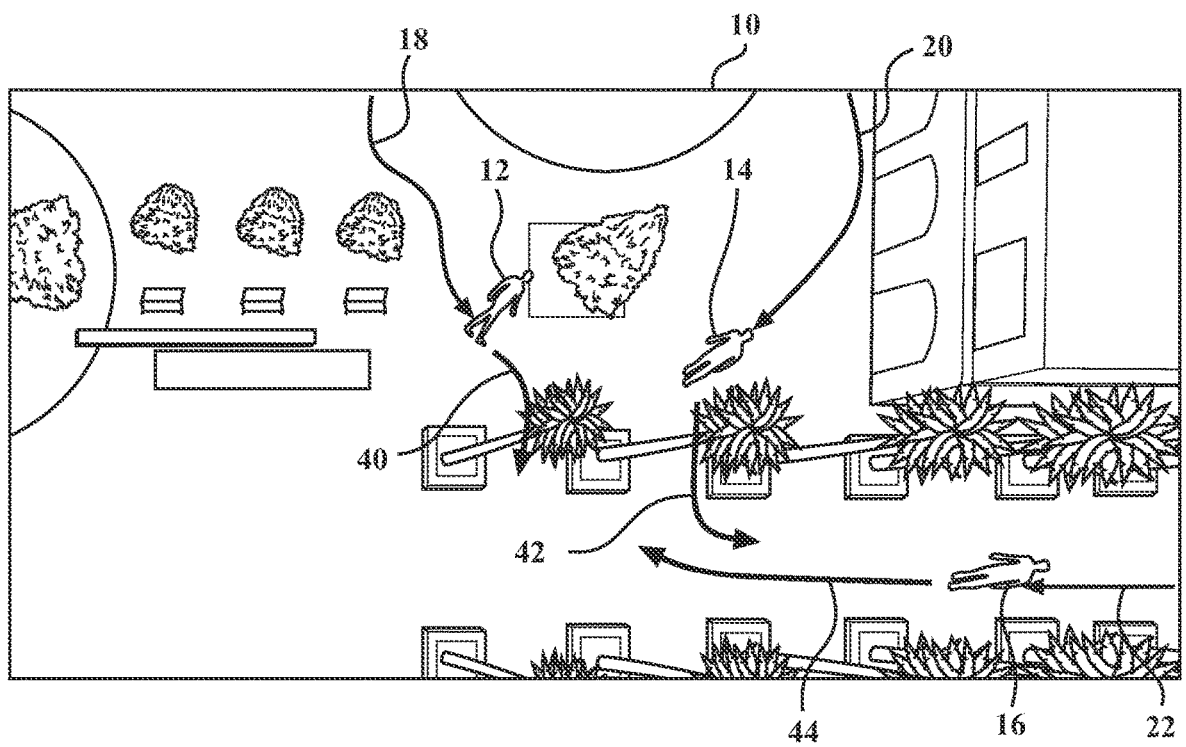

The second step involves conditioning on sampled future endpoints for jointly planning socially compliant trajectories for the pedestrians 12, 14, and 16 within the scene 10. For example, referring to FIG. 1C, this figure illustrates sampled endpoints 32A-32C for the pedestrian 12, sampled endpoints 34A-34C for the pedestrian 14, and sampled endpoints 36A-36C for the pedestrian 16. Using the motion histories 18, 20, and 22 and the sampled endpoints 32A-32C, 34A-34C, and 36A-36C, PECNet can accurately predict the future movements 40, 42, and 44 for the pedestrians 12, 14, and 16, respectively, as best shown in FIG. 1D.

Figure 2:
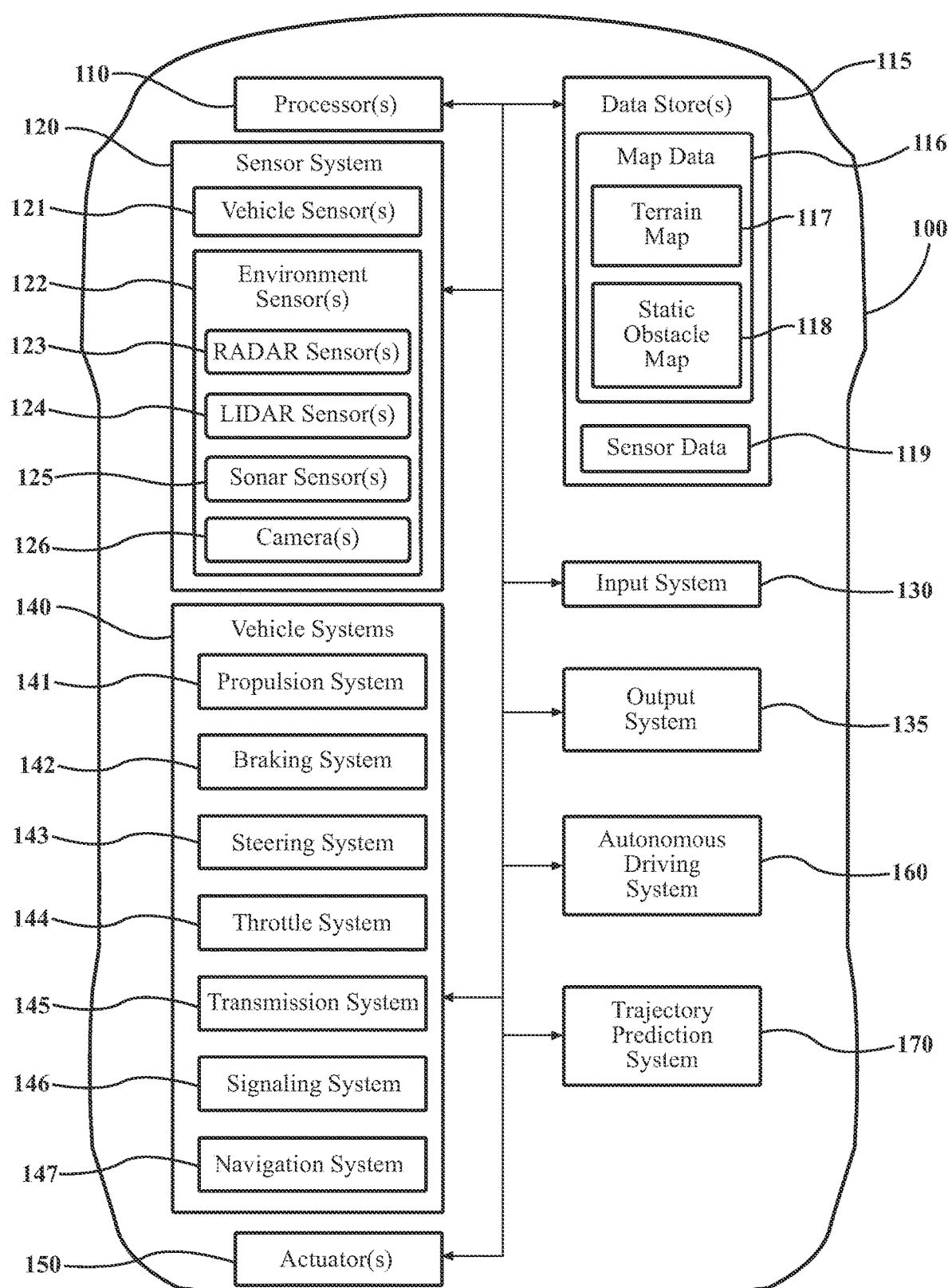
FIG. 2 illustrates a block diagram of a vehicle incorporating a trajectory prediction system that utilizes a predicted endpoint conditioned network.

Referring to FIG. 2, an example of a vehicle 100 is illustrated incorporating a trajectory prediction system 170 that utilizes PECNet. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 2 and will be described along with subsequent figures. However, a description of many of the elements in FIG. 2 will be provided after the discussion of the figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes the trajectory prediction system 170. The trajectory prediction system 170 may be incorporated within an autonomous driving system 160 or may be separate, as shown. The trajectory prediction system 170, as explained earlier, infers distant trajectory endpoints to assist in long-range multi-modal trajectory prediction. A detailed description of how this is accomplished will be described later in this disclosure.

With reference to FIG. 2, one embodiment of the trajectory prediction system 170 is further illustrated. As shown, the trajectory prediction system 170 includes one or more processor(s) 110. Accordingly, the processor(s) 110 may be a part of the trajectory prediction system 170 or the trajectory prediction system 170 may access the processor(s) 110 through a data bus or another communication path. In one or more embodiments, the processor(s) 110 is an application-specific integrated circuit that is configured to implement functions associated with a sensor input module 250, an endpoint distribution module 252, and a future trajectory module 256. In general, the processor(s) 110 is an electronic processor such as a microprocessor that is capable of performing various functions as described herein. In one embodiment, the trajectory prediction system 170 includes a memory 210 that stores the sensor input module 250, the endpoint distribution module 252, and the future trajectory module 256. The memory 210 is a random-access memory (RAM), read-only memory (ROM), a hard disk drive, a flash memory, or other suitable memory for storing the modules 250, 252, and/or 256. The modules 250, 252, and/or 256 are, for example, computer-readable instructions that, when executed by the processor(s) 110, cause the processor(s) 110 to perform the various functions disclosed herein.

Figure 4:
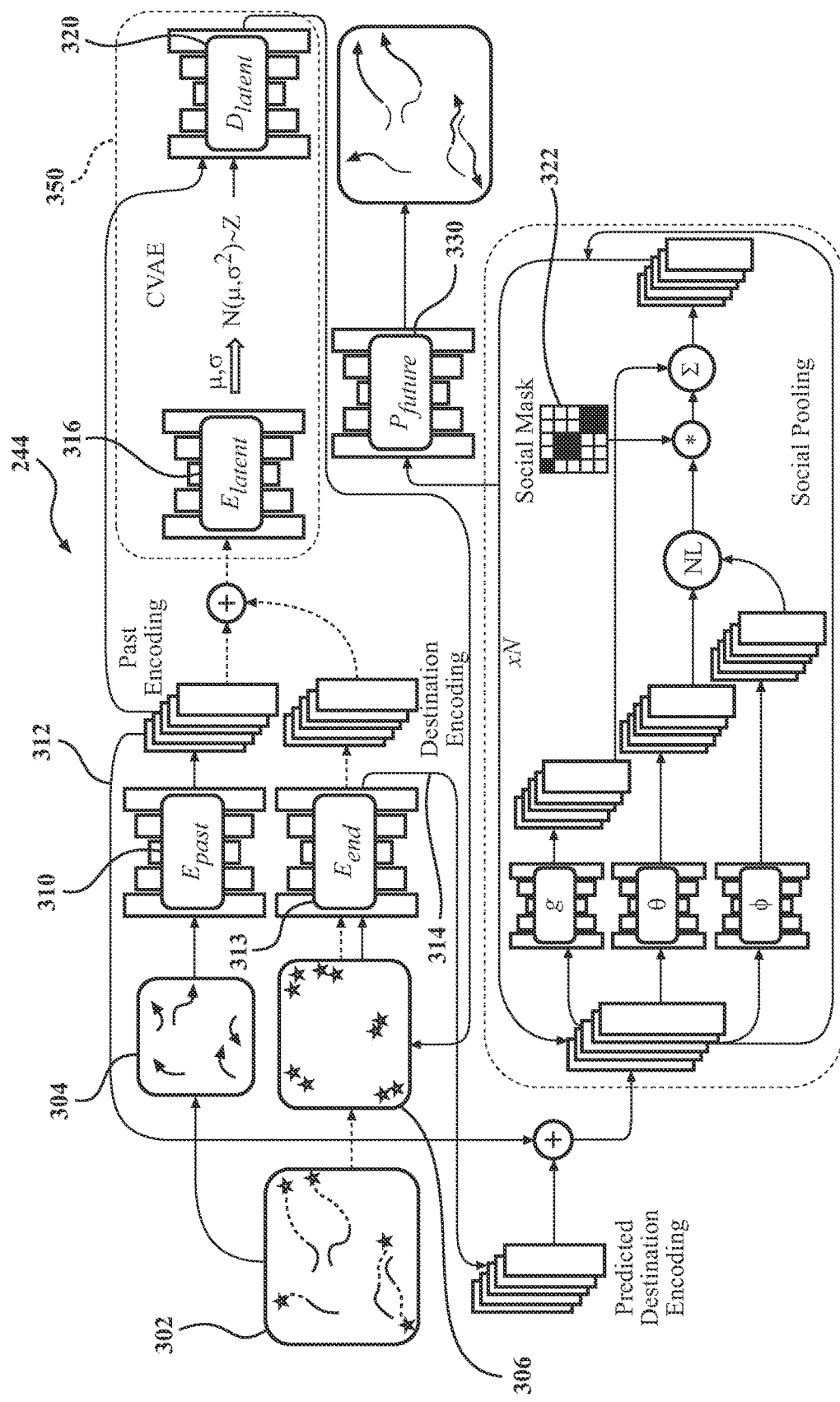
FIG. 4 illustrates a more detailed view of the predicted endpoint conditioned network shown in FIG. 3.

Furthermore, in one embodiment, the trajectory prediction system 170 includes one or more data store(s) 240. The data store(s) 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 240 stores data used and/or generated by the modules 250, 252, and/or 256 in executing various functions. In one embodiment, the data store(s) 240 includes sensor data 242. The sensor data 242 may include some or all of the sensor data 119 shown in FIG. 1 and described later in this disclosure. In one example, the sensor data 242 may include data from one or more environment sensor(s) 122 regarding a scene and elements, such as pedestrians or other agents, within the scene. An example of a scene could be similar to the scene 10 and the pedestrians 12, 14, and 16 shown in FIGS. 1A-1D. Additionally, the data store(s) 240 may also include the PECNet 244, which is a predicted endpoint conditioned network. A full description of the PECNet 244 will be given later in this description and is shown in FIG. 4.

Accordingly, the sensor input module 250 generally includes instructions that function to control the processor(s) 110 to receive sensor data 242 of a scene having a plurality of pedestrians and/or other agents. In one example, the sensor data 242 may have been generated by the environment sensor(s) 122, which may include radar sensor(s) 123, LIDAR sensor(s) 124, sonar sensor(s) 125, and/or camera(s) 126. The information collected from the environment sensor(s) 122 may be combined with other sensor data and/or have processing performed so as to create the sensor data 242.

For example, the sensor data 242 could be a point cloud generated from data by the LIDAR sensor(s) 124 that has been processed to include bounding boxes and/or class identifiers for the bounding boxes. The bounding boxes indicate the location of one or more objects, such as pedestrians, within a scene. It should be understood that this is one form that the sensor data 242 could embody. The sensor data 242 could include other types of data, such as pseudo-LIDAR point clouds, RGB images, depth maps, semantic segmentation information, combinations thereof, and the like. In any implementation, an object detection system may be able to receive information from the environment sensor(s) 122 and detect and/or classify one or more objects.

With regards to the endpoint distribution module 252, the endpoint distribution module 252 includes instructions that, when executed by the processor(s) 110, cause the processor(s) 110 to determine endpoint distributions of a plurality of pedestrians within a scene. The endpoint distributions represent desired end destinations of the plurality of pedestrians from the scene. For example, the endpoint distributions may include multiple distributions, as illustrated as the endpoint distribution 30 of FIG. 1B. Instead of utilizing all the endpoints forming the endpoint distribution 30 of FIG. 1B, a sampling of endpoint distribution may be utilized instead, as shown in FIG. 1C as sampled endpoints 32A-32C for the pedestrian 12, sampled endpoints 34A-34C for the pedestrian 14, and sampled endpoints 36A-36C for the pedestrian 16.

The process for determining the endpoint distributions for a plurality of pedestrians is performed by utilizing the PECNet 244. The PECNet 244 is shown in FIG. 4. Broadly, the PECNet 244 uses past history, $T_i$, along with ground truth endpoint $G_c$ to train a conditional variational autoencoder 350 for multi-modal endpoint inference. The sampled endpoints condition the social-pooling and predictor networks for multi-agent multi-modal trajectory forecasting. Dashed connections in FIG. 4 denote the parts utilized during training. Shades of the same color denote spatio-temporal neighbors encoded with the block diagonal social mask in the social pooling module.

In order to better understand how PECNet 244 operates, suppose a pedestrian $p^k$ enters a scene I. Given the previous trajectory of p on I for $t_p$ steps as a sequence of coordinates $\mathcal{T} := \{u^k\}_{i=1}^{t_p} = \{(x^k, y^k)\}_{i=1}^{t_p}$, the problem requires predicting the future position of $p^k$ on I for next $t_f$ steps, $\mathcal{T} := \{u^k\}_{i=t_p+1}^{t_p+t_f+1} = \{(x, y)\}_{i=t_p+1}^{t_p+t_f+1}$. The PECNet 244 first models the sub-goal of $p^k$, i.e., the last observed trajectory points of $p^k$ say, $G^k = u^k l_{t_f}$ as a representation of the predilection of $p^k$ to go its predetermined route. This sub-goal, also referred to as the endpoint of the trajectory, refers to the pedestrian's desired end destination for the current sequence.

The PECNet 244 models the predilection of the pedestrian as a sub-goal endpoint $G := u_{t_f} = (x_{t_f}, y_{t_f})$, which is the last observed trajectory point for pedestrian $p^k$. The inputs 302 into the PECNet 244 may include sensor data that characterizes the location of one or more pedestrians and their prior trajectory points. The prior trajectory points may be the locations of the pedestrians along with trajectory information that may indicate the speed and/or direction of the pedestrian to which it describes. In this example, the inputs 302 may also include ground-truth information that may be utilized to train the PECNet 244, as will be described later.

A distribution is inferred on G based on the previous location history $T_i$ of $p^k$ using a conditional variational autoencoder 350. The previous history $T_k$ of the one or more pedestrians is extracted from, as well as ground truth endpoints $G^k$ for a plurality of pedestrians $p^k$ in a scene. This is accomplished by encoding the past trajectory $(T_i^k)$ 304 of all pedestrians $p^k$ independently using a past trajectory encoder $E_{past}$ 310, which yields $E_{past} T_i$, a representation of the motion history 312 of the one or more pedestrians. In a similar fashion, the future endpoint $G^k$ 306 is encoded with an endpoint encoder $E_{end}$ 313 to produce future endpoint $E_{end}(G^k)$ 314 independently for pedestrians $p^k$.

The motion history 312 and future endpoint $E_{end}(G^k)$ 314 are concatenated together and passed into the latent encoder $E_{latent}$ 316 which produces parameter $(\mu, \sigma)$ for encoding the latent variable $z \notin N(\mu, \sigma)$ of the conditional variational autoencoder 350. The PECNet 244 then samples possible future endpoints from $N(\mu, \sigma)$ which are decoded using the latent decoder $D_{latent}$ 320 to yield ground truth endpoints $\hat{G}^k$. Since the ground truth endpoints $\hat{G}^k$ belong to the future and are unavailable at testing/inference time, z is sampled unconditioned from N(0, I) and then is used by the latent decoder $D_{latent}$ 320 to estimate ground truth endpoints $\hat{G}^k$ as in the training stage.

The latent distribution N(0, I) may be truncated. In some situations, such as planning a path to intercept a moving agent or because of computation and energy constraints during testing, only a few samples (K=1; 2 or 3) are permissible. The PECNet 244 changes the latent distribution from N(0, I) during testing by truncating the normal at $\mu \pm c\sqrt{K-1}\sigma$, which in the case of a standard normal becomes $\pm c\sqrt{K-1}$).

With regards to the future trajectory module 256, this module includes instructions that, when executed by the processor(s) 110, cause the processor(s) 110 to determine future trajectory points for at least one of the plurality of pedestrians based on prior trajectory points of the plurality of pedestrians and the endpoint distributions, which may be in the form of endpoints $\hat{G}^k$, of the plurality of pedestrians.

Moreover, using the sampled estimate of the endpoints $\hat{G}$ from the conditional variational autoencoder 350, the PECNet 244 employs the endpoint encoder $E_{end}$ 313 once again, within the same forward pass, to obtain encodings for the sampled endpoints $E_{end}(\hat{G}^k)$. The PECNet 244 uses the encodings for the sampled endpoints $E_{end}(\hat{G}^k)$ along with the prediction network to plan the path $T_f$ starting to G, thereby predicting the future path.

The sampled endpoints representations $E_{end}(\hat{G}^k)$ are then concatenated with the motion history 312 and passed through N rounds of the social pooling mask M 322 using a social pooling mask M 322 for all the pedestrians in the scene jointly. The social pooling mask M 322 is an $\alpha \times \alpha$ block diagonal matrix denoting the social neighbors for all $\{p_i\}_{i=1}^{\alpha}$ pedestrians in the scene.

Mathematically, this can be expressed as:

$$M[i, j] = \begin{cases} 0 & \text{if } \min_{1 \leq m,n \leq t_p} \|u_m^i - u_m^j\|_2 > t_{dist} \\ 0 & \text{if } \min_{1 \leq m \leq t_p} |\mathcal{F}(u_0^i) - \mathcal{F}(u_m^j)| * \min_{1 \leq m \leq t_p} |\mathcal{F}(u_m^i) - \mathcal{F}(u_0^j)|) > 0 \\ 1 & \text{otherwise} \end{cases} \quad (1)$$

where F(.) denotes the actual frame number where the trajectory was observed at.

M defines the spatio-temporal neighbors of each pedestrian $p_i$ using proximity threshold $t_{dist}$ for distance in space and ensures temporal overlap. Thus, the matrix M encodes information regarding social locality of different trajectories, which gets utilized in attention-based pooling as described below.

Given the concatenated past history and sampled waypoint representations $X_k^{(1)} = (E_{past} (T_p^k), E_{end} (G_k))$, the PECNet 244 performs N rounds of social pooling where the (i+1)th round of pooling recursively updates the representations $X_k^{(i)}$ from the last round according to the non-local attention mechanism:

$$X_k^{(i+1)} = X_k^{(i)} + \frac{1}{\sum_{j=1}^{\alpha} M_{ij} \cdot e^{\phi(X_k^{(i)})^T \theta(X_j^{(i)})}} \sum_{j=1}^{\alpha} M_{ij} \cdot e^{\phi(X_k^{(i)})^T \theta(X_j^{(i)})} g(X_k^{(i)}) \quad (2)$$

where $\{\theta, \phi\}$ are encoders of $X_k$ to map to a learnt latent space where the representation similarity between $p_i$ and $p_j$ trajectories is calculated using the embedded gaussian $\exp(\phi(X_k)^T \theta(X_j))$ for each round of pooling.

The social pooling mask M 322 is used point-wise to allow pooling only on the spatio-temporal neighbors masking away other pedestrians in the scene. Finally, g is a transformation encoder for $X_k$ used for the weighted sum with all other neighbors. The whole procedure, after being repeated N times, yields $X_k^{(N)}$, the pooled prediction features for each pedestrian with information about the past positions and future destinations of all other neighbors in the scene.

The social pooling mask M 322 extracts relevant information from the neighbors using non-local attention. The social non-local pooling (S-NL) method used by the social pooling mask M 322 is permutation invariant to pedestrian indices as a useful inductive bias for tackling the social pooling task. Further, this method of learnt social pooling is more robust to social neighbor misdetection, such as misspecified distance ($t_{dist}$) threshold compared to other methodologies such as max-pooling, sorting based pooling, or rigid grid-based pooling since a learning-based method can ignore spurious signals in the social pooling mask M 322.

Thereafter, the PECNet 244 passes the pooled features $X_k^{(N)}$ through a prediction network $P_{future}$ 330 to yield the estimate of rest of trajectory $\{u^k\}_{k=t_p+1}^{t_p+t_f}$ which, when concatenated with sampled endpoint $\hat{G}$, yields $\hat{T}_f$.

For training of the PECNet 244, the following loss function may be utilized:

$$\mathcal{L}_{PECNet} = \lambda_1 \underbrace{D_{KL}(\mathcal{N}(\mu, \sigma) \| \mathcal{N}(0, I))}_{\text{KL Div in latent space}} + \lambda_2 \underbrace{\|\hat{\mathcal{G}} - \mathcal{G}_c\|_2^2}_{AEL} + \underbrace{\|\hat{\mathcal{T}}_f - \mathcal{T}_f\|^2}_{ATL} \quad (3)$$

where the KL divergence term is used for the conditional variational autoencoder 350, the Average Endpoint Loss (AEL) trains the endpoint encoder $E_{end}$ 313, the past trajectory encoder $E_{past}$ 310, the latent encoder $E_{latent}$ 316 and the latent decoder $D_{latent}$ 320. The Average Trajectory Loss (ATL) trains the entire module together.

As to network architectures, these are shown in the table below

| Network Name | Network Architecture |
| --- | --- |
| endpoint encoder $E_{end}$ 313 | 2 →8 →16 →16 |
| past trajectory encoder $E_{past}$ 310 | 16 →512 →256 →16 |
| latent encoder $E_{latent}$ 316 | 32 →8 →50 →32 |
| latent decoder $D_{latent}$ 320 | 32 →1024 →512 →1024 →2 |
| Φ, θ | 32 →512 →64 →128 |
| g | 32 →512 →64 →32 |
| prediction network $P_{future}$ 330 | 32 →1024 →512 →256 →22 |

Figure 3:
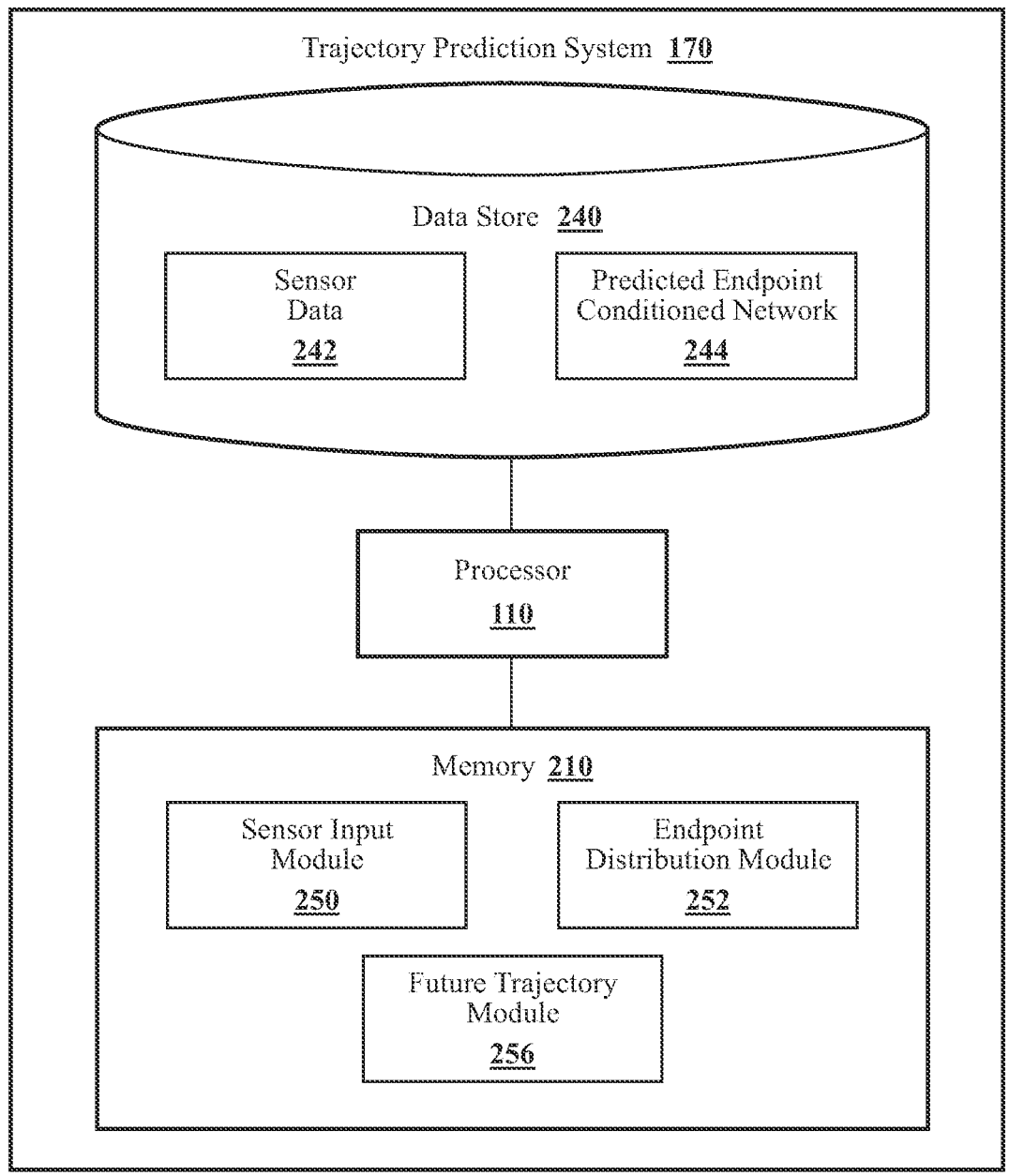
FIG. 3 illustrates a more detailed block diagram of the trajectory prediction system of FIG. 2.
Figure 5:
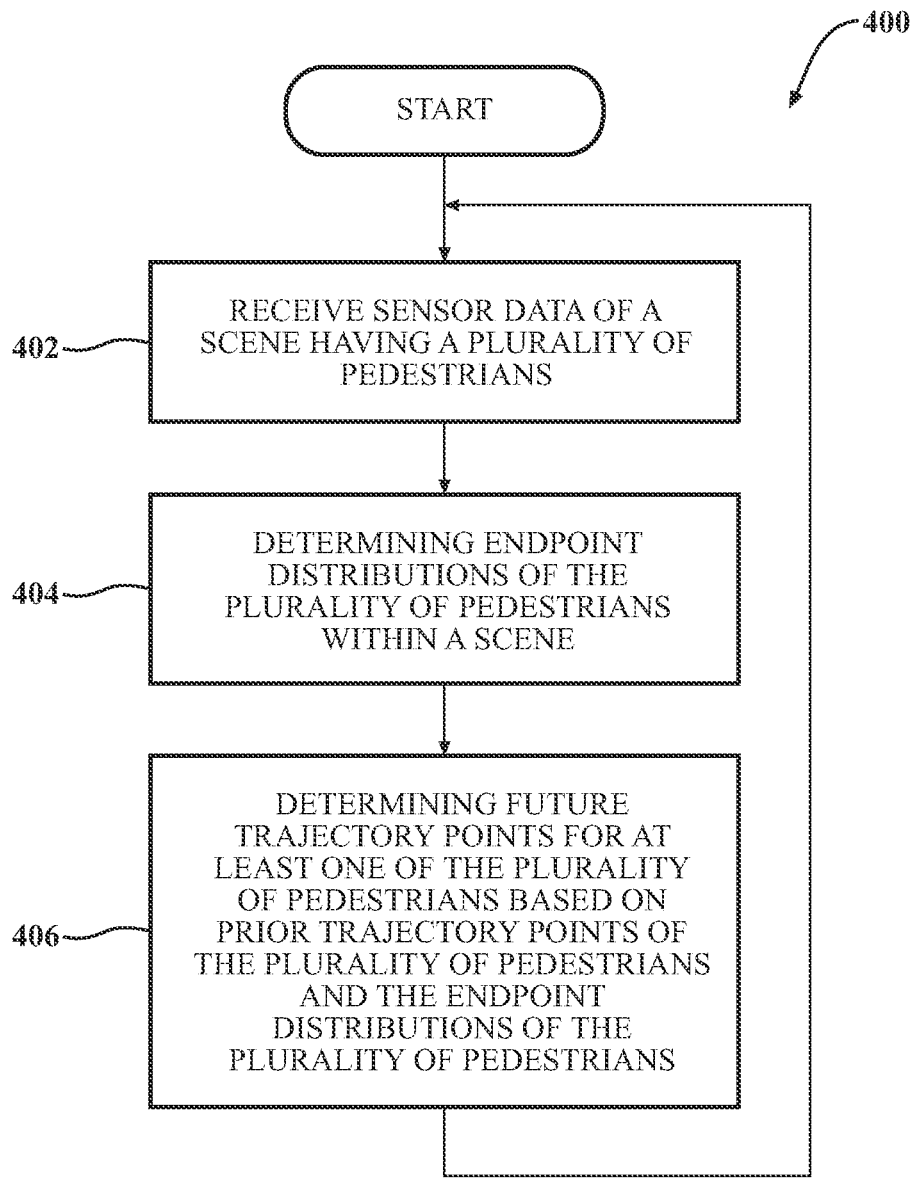
FIG. 5 illustrates a method for trajectory prediction using a predicted endpoint conditioned network.

Referring to FIG. 5, a method 400 for trajectory prediction using a predicted endpoint conditioned network is shown. The method 400 will be described from the viewpoint of the vehicle 100 of FIG. 2, the trajectory prediction system 170 of FIG. 3, and the PECNet 244 of FIG. 4. However, it should be understood that this is just one example of implementing the method 400. While method 400 is discussed in combination with the trajectory prediction system 170, it should be appreciated that the method 400 is not limited to being implemented within the trajectory prediction system 170, but is instead one example of a system that may implement the method 400.

The method 400 begins at step 402, wherein the sensor input module 250 causes the processor(s) 110 to receive sensor data 242 of a scene having a plurality of pedestrians and/or other agents. In one example, the sensor data 242 may have been generated by the environment sensor(s) 122, which may include radar sensor(s) 123, LIDAR sensor(s) 124, sonar sensor(s) 125, and/or camera(s) 126. The information collected from the environment sensor(s) 122 may be combined with other sensor data and/or have processing performed so as to create the sensor data 242.

In step 404, the endpoint distribution module 252 causes the processor(s) 110 to determine endpoint distributions of a plurality of pedestrians within a scene. The endpoint distributions represent desired end destinations of the plurality of pedestrians from the scene. For example, the endpoint distributions may include multiple distributions, as illustrated as the endpoint distribution 30 of FIG. 1B. Instead of utilizing all the endpoints forming the endpoint distribution 30 of FIG. 1B, a sampling of endpoint distributions may be utilized instead, as shown in FIG. 1C as sampled endpoints 32A-32C for the pedestrian 12, sampled endpoints 34A-34C for the pedestrian 14, and sampled endpoints 36A-36C for the pedestrian 16.

The process for determining the endpoint distributions for a plurality of pedestrians is performed by utilizing the PECNet 244. As explained previously, the PECNet 244 uses past history, $T_i$, along with ground truth endpoint $G_c$, to train a conditional variational autoencoder 350 for multi-modal endpoint inference.

In step 406, the future trajectory module 256 causes the processor(s) 110 to determine future trajectory points for at least one of the plurality of pedestrians based on prior trajectory points of the plurality of pedestrians and the endpoint distributions, which may be in the form of endpoints $\hat{G}^k$, of the plurality of pedestrians. As explained previously, a socially compliant future trajectory is predicted, conditioned not only on the pedestrian and their immediate neighbors' histories (observed trajectories) but also the other pedestrians' estimated endpoints.

FIG. 2 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 2). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensor(s) 122 configured to acquire, and/or sense driving environment data. "Driving environment data" includes data or information about the external environment in which an autonomous vehicle is located or one or more portions thereof. For example, the one or more environment sensor(s) 122 can be configured to detect, quantify, and/or sense obstacles in at least a portion of the external environment of the vehicle 100 and/or information/data about such obstacles. Such obstacles may be stationary objects and/or dynamic objects. The one or more environment sensor(s) 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensor(s) 122 and/or the one or more vehicle sensor(s) 121. However, it will be understood that the embodiments are not limited to the particular sensors described.

As an example, in one or more arrangements, the sensor system 120 can include one or more radar sensor(s) 123, one or more LIDAR sensor(s) 124, one or more sonar sensor(s) 125, and/or one or more camera(s) 126. In one or more arrangements, the one or more camera(s) 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the trajectory prediction system 170, and/or the autonomous driving system 160 can be operatively connected to communicate with the vehicle systems 140 and/or individual components thereof. For example, returning to FIG. 2, the processor(s) 110 and/or the autonomous driving system 160 can be in communication to send and/or receive information from the vehicle systems 140 to control the movement, speed, maneuvering, heading, direction, etc. of the vehicle 100. The processor(s) 110, the trajectory prediction system 170, and/or the autonomous driving system 160 may control some or all of these vehicle systems 140 and, thus, may be partially or fully autonomous.

The processor(s) 110, the trajectory prediction system 170, and/or the autonomous driving system 160 can be operatively connected to communicate with the vehicle systems 140 and/or individual components thereof. For example, returning to FIG. 2, the processor(s) 110, the trajectory prediction system 170, and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the trajectory prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 242. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for trajectory prediction comprising the steps of:
    encoding prior trajectory points of a plurality of pedestrians using a past trajectory encoder to generate a motion history for the plurality of pedestrians;
    sampling, by a latent encoder, possible future endpoints of the plurality of pedestrians from a latent distribution, the latent encoder being part of a convolutional variational autoencoder;
    generating endpoint distributions of the plurality of pedestrians by a latent decoder using the possible future endpoints and the motion history for the plurality of pedestrians, the latent decoder being part of the convolutional variational autoencoder, the endpoint distributions representing desired end destinations of the plurality of pedestrians from a scene; and
    determining future trajectory points for at least one of the plurality of pedestrians based on prior trajectory points of the plurality of pedestrians and the endpoint distributions of the plurality of pedestrians.

2. The method of claim 1, further comprising truncating the latent distribution.

3. The method of claim 1, wherein the step of determining future trajectory points further comprises the steps of:
    encoding the endpoint distributions of the plurality of pedestrians by an endpoint decoder to generate encodings for the endpoint distributions of the plurality of pedestrians;
    concatenating the encodings for the endpoint distributions of the plurality of pedestrians with a motion history for the plurality of pedestrians to generate a plurality of concatenations;
    passing the plurality of concatenations through one or more rounds of pooling using a social pooling mask for the plurality of pedestrians jointly within the scene to generate pooled features; and
    passing the pooled features though a prediction network to generate the future trajectory points for at least one of the plurality of pedestrians.

4. The method of claim 3, wherein the social pooling mask is used point-wise to allow pooling on spatio-temporal neighbors of each of the plurality of pedestrians.

5. The method of claim 3, wherein the pooled features includes past positions of neighbors and future destinations of neighbors of the plurality of pedestrians in the scene.

6. The method of claim 1, wherein the scene is a fixed scene.

7. The method of claim 1, wherein the scene moves based on a movement of an ego vehicle.

8. A trajectory prediction system comprising:
one or more processors; and
a memory in communication with the one or more processors, the memory having:
  a sensor input module, the sensor input module having instructions that, when executed by the one or more processors, causes the one or more processors to receive sensor data of a scene having a plurality of pedestrians,
  an endpoint distribution module having instructions that, when executed by the one or more processors, causes the one or more processors to: encode prior trajectory points of a plurality of pedestrians using a past trajectory encoder to generate a motion history for the plurality of pedestrians, sample, by a latent encoder, possible future endpoints of the plurality of pedestrians from a latent distribution, the latent encoder being part of a convolutional variational autoencoder, and generate endpoint distributions of the plurality of pedestrians by a latent decoder using the possible future endpoints and the motion history for the plurality of pedestrians, the latent decoder being part of the convolutional variational autoencoder, the endpoint distributions representing desired end destinations of the plurality of pedestrians from the scene, and
  a future trajectory module having instructions that, when executed by the one or more processors causes the one or more processors to determine future trajectory points for at least one of the plurality of pedestrians based on prior trajectory points of the plurality of pedestrians and the endpoint distributions of the plurality of pedestrians.

9. The system of claim 8, wherein the endpoint distribution module further includes instructions that, when executed by the one or more processors causes the one or more processors to truncate the latent distribution.

10. The system of claim 8, wherein the future trajectory module further includes instructions that, when executed by the one or more processors causes the one or more processors to:
  encode the endpoint distributions of the plurality of pedestrians by an endpoint decoder to generate encodings for the endpoint distributions of the plurality of pedestrians,
  concatenate the encodings for the endpoint distributions of the plurality of pedestrians with a motion history for the plurality of pedestrians to generate a plurality of concatenations;
  pass the plurality of concatenations through one or more rounds of pooling using a social pooling mask for the plurality of pedestrians jointly within the scene to generate pooled features; and
  pass the pooled features though a prediction network to generate the future trajectory points for at least one of the plurality of pedestrians.

11. The system of claim 10, wherein the social pooling mask is used point-wise to allow pooling on spatio-temporal neighbors of each of the plurality of pedestrians.

12. The system of claim 10, wherein the pooled features includes past positions of neighbors and future destinations of neighbors of the plurality of pedestrians in the scene.

13. The system of claim 8, wherein the scene is a fixed scene.

14. The system of claim 8, wherein the scene moves based on a movement of an ego vehicle.

15. A non-transitory computer-readable medium storing instructions that, when executed by one or more processors, cause the one or more processors to:
  obtain sensor data of a scene having a plurality of pedestrians;
  encode prior trajectory points of the plurality of pedestrians using a past trajectory encoder to generate a motion history for the plurality of pedestrians;
  sample, by a latent encoder, possible future endpoints of the plurality of pedestrians from a latent distribution, the latent encoder being part of a convolutional variational autoencoder; and
  generate endpoint distributions of the plurality of pedestrians by a latent decoder using the possible future endpoints and the motion history for the plurality of pedestrians, the latent decoder being part of the convolutional variational autoencoder, the endpoint distributions representing desired end destinations of the plurality of pedestrians from the scene; and
  determine future trajectory points for at least one of the plurality of pedestrians based on prior trajectory points of the plurality of pedestrians and the endpoint distributions of the plurality of pedestrians.

16. The non-transitory computer-readable medium of claim 15, further storing instructions that, when executed by one or more processors, cause the one or more processors to:
  encode the endpoint distributions of the plurality of pedestrians by an endpoint decoder to generate encodings for the endpoint distributions of the plurality of pedestrians;
  concatenate the encodings for the endpoint distributions of the plurality of pedestrians with a motion history for the plurality of pedestrians to generate a plurality of concatenations;
  pass the plurality of concatenations through one or more rounds of pooling using a social pooling mask for the plurality of pedestrians jointly within the scene to generate pooled features; and
  pass the pooled features though a prediction network to generate the future trajectory points for at least one of the plurality of pedestrians.

17. The non-transitory computer-readable medium of claim 16, wherein the pooled features includes past positions of neighbors and future destinations of neighbors of the plurality of pedestrians in the scene.

* * * * *